(12) United States Patent
Shin et al.

(10) Patent No.: US 7,044,284 B2
(45) Date of Patent: May 16, 2006

(54) DISC AND HUB ASSEMBLY FOR ELECTROMAGNETIC CLUTCH IN A COMPRESSOR

(75) Inventors: Jangsoon Shin, Daejeon-si (KR); Eungi Son, Daejeon-si (KR)

(73) Assignee: Halla Climate Control Corporation, Daejeon (KR)

( * ) Notice: Subject to any disclaimer, the term of this patent is extended or adjusted under 35 U.S.C. 154(b) by 56 days.

(21) Appl. No.: 10/863,286

(22) Filed: Jun. 9, 2004

(65) Prior Publication Data

US 2004/0251106 A1    Dec. 16, 2004

(30) Foreign Application Priority Data

Jun. 10, 2003 (KR) .................. 10-2003-0037263
Apr. 30, 2004 (KR) .................. 10-2004-0030387

(51) Int. Cl.
*F16D 27/112* (2006.01)

(52) U.S. Cl. .................. 192/200; 192/89.94; 192/30 V

(58) Field of Classification Search .............. 192/84.94
See application file for complete search history.

(56) References Cited

U.S. PATENT DOCUMENTS

| | | | | |
|---|---|---|---|---|
| 4,243,128 A | * | 1/1981 | Shirai | 192/35 |
| 4,493,407 A | * | 1/1985 | Newton | 192/84.941 |
| 5,445,256 A | * | 8/1995 | Tabuchi et al. | 192/84.96 |
| 5,551,546 A | * | 9/1996 | Tabayama et al. | 192/84.96 |
| 5,667,050 A | * | 9/1997 | Hasegawa | 192/84.961 |
| 6,209,699 B1 | | 4/2001 | Hayashi et al. | |

FOREIGN PATENT DOCUMENTS

| | | |
|---|---|---|
| EP | 0 614 022 A1 | 9/1994 |
| EP | 0 836 026 A2 | 4/1998 |
| JP | 62-165031 | 7/1987 |
| JP | 2002-48155 | 2/2002 |

OTHER PUBLICATIONS

European Search Report for Application No. EP 04 01 3640 dated Apr. 15, 2005.

* cited by examiner

*Primary Examiner*—Richard M. Lorence
(74) *Attorney, Agent, or Firm*—Nixon Peabody LLP; Jeffrey L. Costellia

(57) ABSTRACT

The present invention relates to a disc and hub assembly for an electromagnetic clutch of a compressor. The assembly comprises: a disc (120) adapted to be attracted to or separated from a friction surface of a pulley under the action of an electromagnetic coil; a hub (110) coupled to a driving shaft of the compressor, the hub penetrating the disc (120) and having a flange (112) formed on its outer peripheral surface; a plate spring (130) which includes a plate portion (131) coupled to the top surface of the disc (120), a number of leaf spring portions (135) obliquely extending inwardly from the plate portion (131) to be coupled to the flange (112) of the hub (110) and having ends (137) which are bent toward the disc (120), and dampers (160) coupled to the ends of the leaf spring portions (135); and a shock-absorbing member (140) interposed between the disc (120) and the plate portion (131) to reduce noise and impact during on/off of the clutch.

6 Claims, 7 Drawing Sheets

--Prior Art--

--Prior Art--

DISC AND HUB ASSEMBLY FOR ELECTROMAGNETIC CLUTCH IN A COMPRESSOR

BACKGROUND OF THE INVENTION

1. Field of the Invention

The present invention relates to a disc and hub assembly for an electromagnetic clutch of a compressor, and more particularly to a disc and hub assembly for an electromagnetic clutch of a compressor wherein a bumper is interposed between its disc and plate spring to reduce noise and impact during on/off of the clutch, and is prevented from separating due to centrifugal force or being damaged, e.g., being torn off, thereby improving durability and further improving noise reduction effect.

2. Background of the Related Art

A compressor is a component of an air-conditioning system of an automobile. Power is selectively transmitted from an engine to the compressor via a pulley by means of interruption of an electromagnetic clutch. The compressor then compresses a refrigerant, which is supplied from an evaporator, and sends it to a condenser.

The electromagnetic clutch, which transmits the power from the engine to the compressor, comprises: a pulley rotatably installed on the compressor via a bearing; a field core unit supported on the compressor in such a manner that it is inserted into the pulley and adapted to generate an electromagnetic force in accordance with application of electric power; and a disc and hub assembly connected to a driving shaft of the compressor via a hub and configured in such a manner that its disc is attracted to or separated from a friction surface of the pulley by means of the electromagnetic force, which is generated by an electromagnetic coil of the field core unit, to selectively transmit the power from the engine to the driving shaft of the compressor.

FIGS. 1 and 2 show an example of the disc and hub assembly, which uses a number of leaf springs, among the configuration of the above-mentioned electromagnetic clutch. As shown in the drawings, the assembly includes a hub 10, a disc 20, and leaf springs 30.

The hub 10 is composed of a hub body 11, which is provided with a coupling hole 11a having a spline (not shown) formed therein for spline coupling with a driving shaft (not shown) of a compressor, and a flange 12 formed around an outer peripheral surface of the hub body 11 near an end of the body 11.

The flange 12 of the hub 10 has a number of (e.g., three as in the drawing) rivet coupling holes 12a formed thereon.

The disc 20 has a through-hole 22a formed in its center, the diameter of which is larger than that of the flange 12 of the hub 10.

More specifically, the disc 20 comprises an outer ring 21; an inner ring 22 positioned inside the outer ring 21 in such a manner as to be spaced apart from the outer ring 21 and the flange 12 of the hub 10 by a regular interval; and bridge portions 23 which connect the outer ring 21 with the inner ring 22 and define arc-shaped slots 24 together with the outer and inner rings along its circumferential direction.

The outer ring 21 has a number of (three in the drawing) rivet coupling holes 25 formed therein.

The flange 12 of the hub 10 is inserted into the through-hole 22a of the disc 20 to be located in position in the through-hole 22a.

The leaf springs 30 are bent with a predetermined angle, and have holes 31a, 33a, and 32a formed at both ends 31 and 33 and bent portions 32 thereof.

One ends 31 of the leaf springs 30 are coupled to the outer ring 21 in such a manner that rivets 55 pass through the rivet coupling holes 25 of the outer ring 21 and the holes 31a of the leaf springs 30 which are matched with each other.

Dampers 40 of rubber material are fit into the holes 33a, which are formed on the other ends 33 of the leaf spring 30. Then, the dampers 40 contact and support the inner ring 22, so that the other ends 33 of the leaf springs 30 are spaced apart from the inner ring 22 by a predetermined distance.

The holes 32a, which are formed on the bent portions 32 of the leaf springs 30, are coupled to the rivet coupling holes 12a, which are formed on the flange 12 of the hub 10, via rivets 50.

The conventional disc and hub assembly 1, configured as above, is operated as follows: when electric power is applied to an electromagnetic coil of its field core unit (not shown), the electromagnetic coil generates an electromagnetic force and power from the engine is transmitted to the disc 20, at which time the disc 20 is then moved toward a rotating pulley (not shown) and is attracted to the friction surface of the pulley. As such, a friction force makes it possible to transmit the power from the engine to the driving shaft of the compressor via the disc 20 and the hub 10.

When the application of electric power to the electronic coil is interrupted, the disc 20 is separated from the friction surface of the pulley, due to an elastic restoration force of the leaf springs 30, and power is no longer transmitted to the driving shaft of the compressor.

However, the conventional disc and hub assembly 1, as mentioned-above, has a problem in that a severe noise is generated during on/off operation of the electromagnetic clutch, due to a structural defect, and thus it is not applicable to other products.

In particular, when electric power is applied to the electronic coil and the disc 20 is attracted to the friction surface of the pulley, a metallic hitting sound is generated due to a collision between the disc 20 and the pulley to generate a noise. Such a noise may be transmitted to and annoy a driver in the passenger's room.

In addition, since the arc-shaped slots 24 of the disc 20 are exposed to the outside, dust or alien substances may be introduced into the assembly through the slots 24 and reach the friction surface of the pulley. Then, the friction force between the pulley and the disc 20 is decreased, and hence the power transmission efficiency is deteriorated. The disc 20 or the friction surface of the pulley may also be damaged.

Furthermore, the durability of the leaf springs 30 is problematic.

SUMMARY OF THE INVENTION

Therefore, the present invention has been made in view of the above problems, and it is an object of the present invention to provide a disc and hub assembly for an electromagnetic clutch of a compressor wherein a bumper, which is configured as a single body or is separated into a plurality of fractions, is coupled between its disc and plate spring and a protrusion is formed on the plate portion along a circumferential direction of the plate spring to correspond to the outer periphery of the bumper, so that noise and impact are reduced during on/off of the electromagnetic clutch and, the bumper is prevented from separating due to centrifugal force or being damaged, e.g., being torn off, thereby improving durability and further improving noise reduction effect.

Another object of the present invention is to provide a disc and hub assembly for an electromagnetic clutch of a compressor wherein its leaf spring prevents any alien substance from entering between its disc and pulley, so that its power transmission efficiency is improved and any damage to the disc and the friction surface of the pulley is avoided.

To accomplish the above objects, according to the present invention, there is provided a disc and hub assembly for an electromagnetic clutch of a compressor, including: a disc adapted to be attracted to or separated from a friction surface of a pulley under the action of an electromagnetic coil; a hub coupled to a driving shaft of the compressor, the hub penetrating the disc and having a flange formed on its outer peripheral surface; a plate spring which includes a plate portion coupled to the top surface of the disc, a number of leaf spring portions obliquely extending inwardly from the plate portion to be coupled to the flange of the hub and having ends which are bent toward the disc, and dampers coupled to the ends of the leaf spring portions; and shock-absorbing means interposed between the disc and the plate portion to reduce noise and impact during on/off of the clutch.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention with reference to the attached drawings.

In the following description of the present invention, a detailed description of known functions and configurations incorporated herein will be omitted when it may make the subject matter of the present invention rather unclear.

Figure 1:
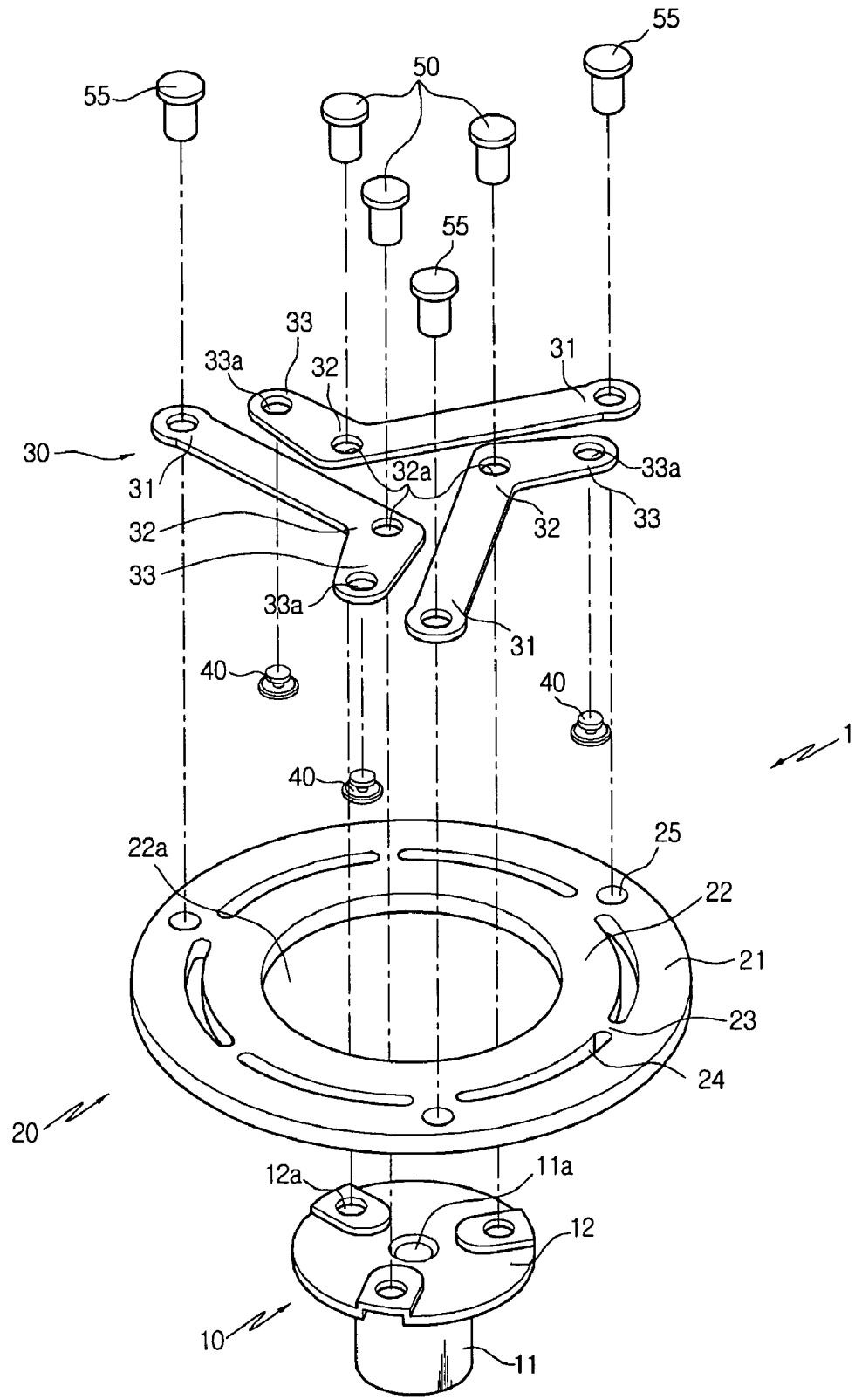
FIG. 1 is an exploded perspective view showing a conventional disc and hub assembly.
Figure 2:
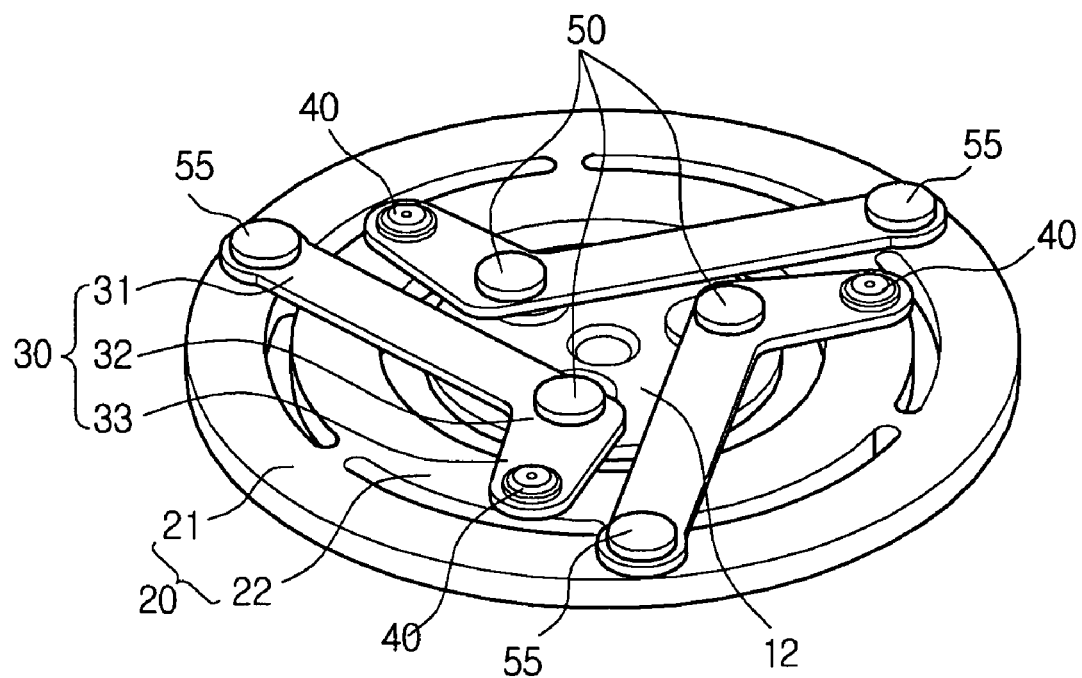
FIG. 2 is an assembled perspective view showing a conventional disc and hub assembly.
Figure 3:
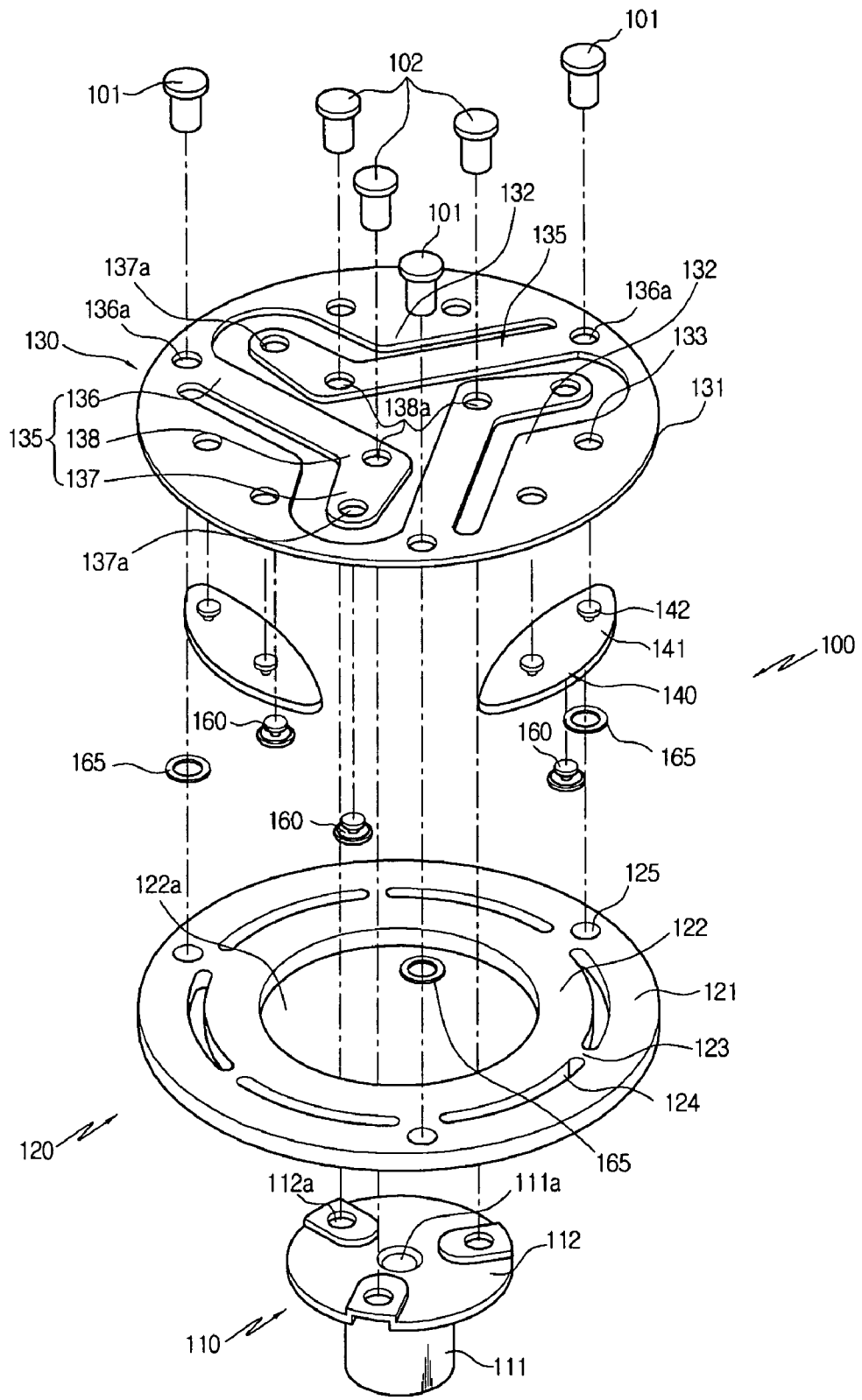
FIG. 3 is an exploded perspective view showing a disc and hub assembly according to a first embodiment of the present invention.
Figure 4:
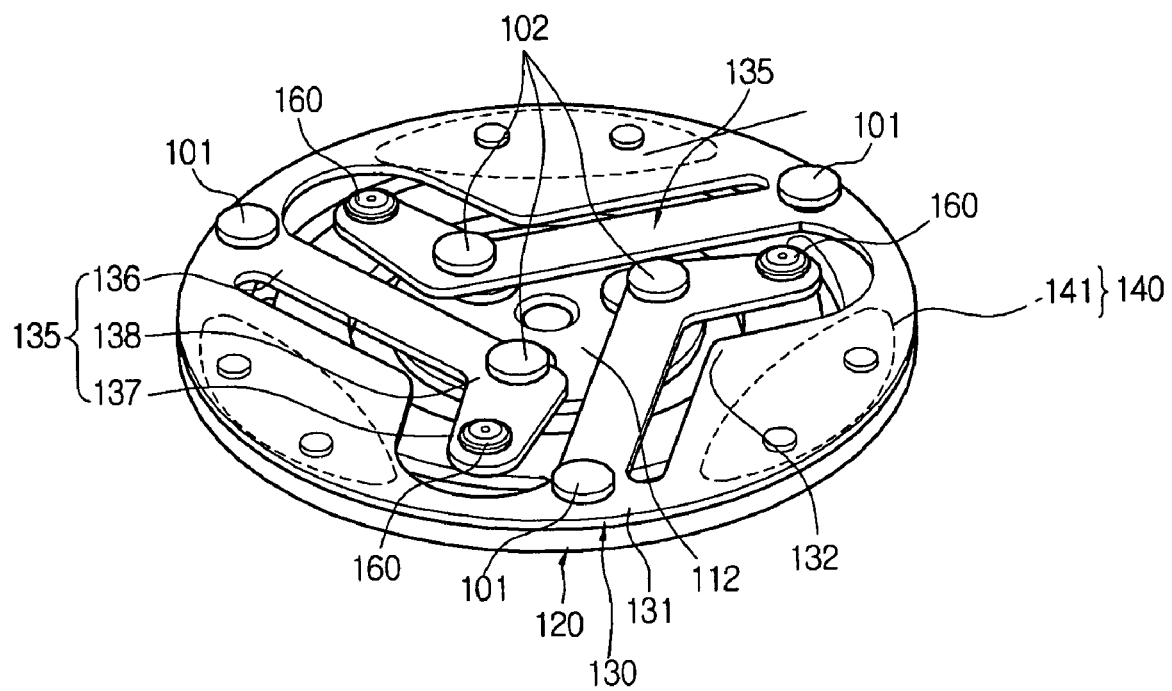
FIG. 4 is an assembled perspective view showing a disc and hub assembly according to a first embodiment of the present invention.

FIG. 3 is an exploded perspective view showing a disc and hub assembly according to a first embodiment of the present invention and FIG. 4 is an assembled perspective view showing the disc and hub assembly according to the first embodiment of the present invention.

As shown in the drawings, the disc and hub assembly 100 according to the present invention includes a hub 110, a disc 120, a plate spring 130, and shock-absorbing means 140.

The hub 110 is provided with a hub body 111 which has a coupling hole 111a formed at its center for spline coupling with a driving shaft (not shown) of a compressor, and with a flange 112 which is formed around an outer peripheral surface of the hub body 111 near an end thereof. The flange 112 has a number of rivet coupling holes 112a formed thereon at regularly spaced intervals for coupling with leaf spring portions 135 (described below) of the plate spring 130.

The disc 120 is composed of an outer ring 121, an inner ring 122 which is positioned inside the outer ring 121 in such a manner as to be spaced apart from the outer ring 121 by a regular interval and has a through-hole 122a formed in its center for accommodating the flange 112 of the hub 110 therein, and a number of bridge portions 123 which connect the outer ring 121 with the inner ring 122 and define a number of arc-shaped slots 124 together with the outer ring and the inner ring along its circumferential direction.

The outer ring 121 has a number of (three in the drawing) rivet coupling holes 125 formed thereon at regularly spaced intervals for coupling with the plate spring 130.

The plate spring 130 is composed of a plate portion 131 coupled to the top surface of the disc 120; a number of leaf spring portions 135 obliquely extending inwardly from the plate portion 131 toward the flange 112 of the hub 110 by a predetermined length and having ends 137, which are bent and extend by a predetermined length toward the disc 120; and dampers 160 coupled to the ends 137 of the leaf spring portions 135.

The leaf spring portions 135 preferably have a predetermined elasticity.

The plate portion 131 has extension surfaces 132 extending along a bent contour of the respective leaf spring portions 135. The extension surfaces 132 are provided with bumper coupling holes 133 formed thereon for coupling with bumpers 141 (described below).

Bases 136 of the leaf spring portions 135 have rivet insertion holes 136a formed thereon so that the plate spring 130 can be coupled to the rivet coupling holes 125, which are formed on the disc 120, via rivets 101. Bent portions 138 of the leaf springs 135 have rivet insertion holes 138a formed thereon to be coupled to the rivet coupling holes 112a, which are formed on the flange 112 of the hub 110, via rivets 102.

As such, the disc 120 is resiliently connected and coupled to the flange 112 of the hub 110 by means of the leaf spring portions 135, which have a predetermined elasticity. The disc 120 then can be resiliently moved forward and backward relative to the flange 112 of the hub 110, which is fixedly coupled to the driving shaft of the compressor.

The ends 137 of the leaf spring portions 135 are provided with damper coupling holes 137a, to which dampers 160 of rubber material are coupled from near the disc 120 to contact and support the inner ring 122 of the disc 120.

When the electromagnetic clutch is turned on, the disc 120 is separated from the dampers 160 and is attracted to the friction surface of the pulley. When the clutch is turned off, the disc 120 returns to its initial position, due to an elastic restoration force from the leaf spring portions 135, and hit the dampers 160. The dampers 160 then absorb and damp any impact to reduce noise.

Meanwhile, spacers 165 are interposed between the disc 120 and the plate spring 130 in locations where they are coupled to each other via the rivets 101.

Furthermore, shock-absorbing means 140 are positioned between the disc 120 and the plate portion 131 of the leaf spring 135 to reduce noise and impact during on/off of the electromagnetic clutch.

The shock-absorbing means 140 are composed of bumpers 141 of rubber material, which are coupled to the extension surfaces 132 of the plate portion 131.

Each of the bumpers 141 is configured as a single body and is coupled to each of the extension surfaces 132. The bumpers 141 may be made of various materials, in addition to rubber.

Fastening hooks 142 are integrally formed with the bumpers 141 for coupling with the bumper coupling holes 133.

Such bumpers 141 absorb noise and impact during on/off of the electromagnetic clutch for more improved noise reduction effect. In particular, they absorb a metallic hitting sound, which is generated when the clutch is switch on and the disc 120 is attracted to the friction surface of the pulley. This prevents any noise from annoying a driver of an automobile.

Although not shown in the drawings, a number of arc-shaped protrusions (not shown) may be formed on the plate portion 131 along a circumferential direction of the plate spring to correspond to an outer periphery of each of the bumpers 141 or a number of arc-shaped protrusions (not shown) may be formed on the disc 120 along a circumferential direction of the disc, so that the bumpers 141 are prevented from separating from the plate portion of the plate spring due to continuous centrifugal force during high speed revolution of the disc 120.

Figure 5:
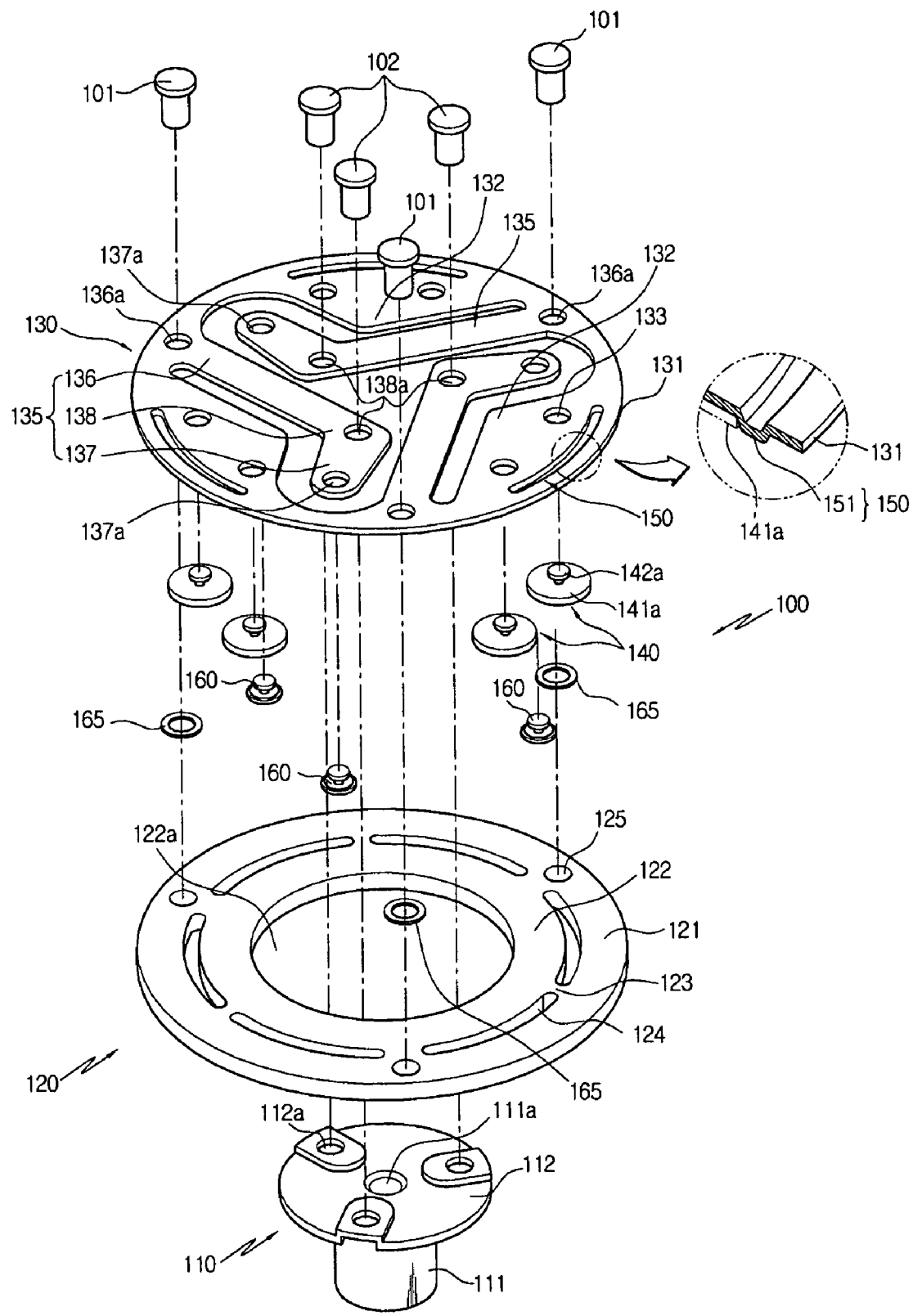
FIG. 5 is an exploded perspective view showing a disc and hub assembly according to a second embodiment of the present invention.
Figure 6:
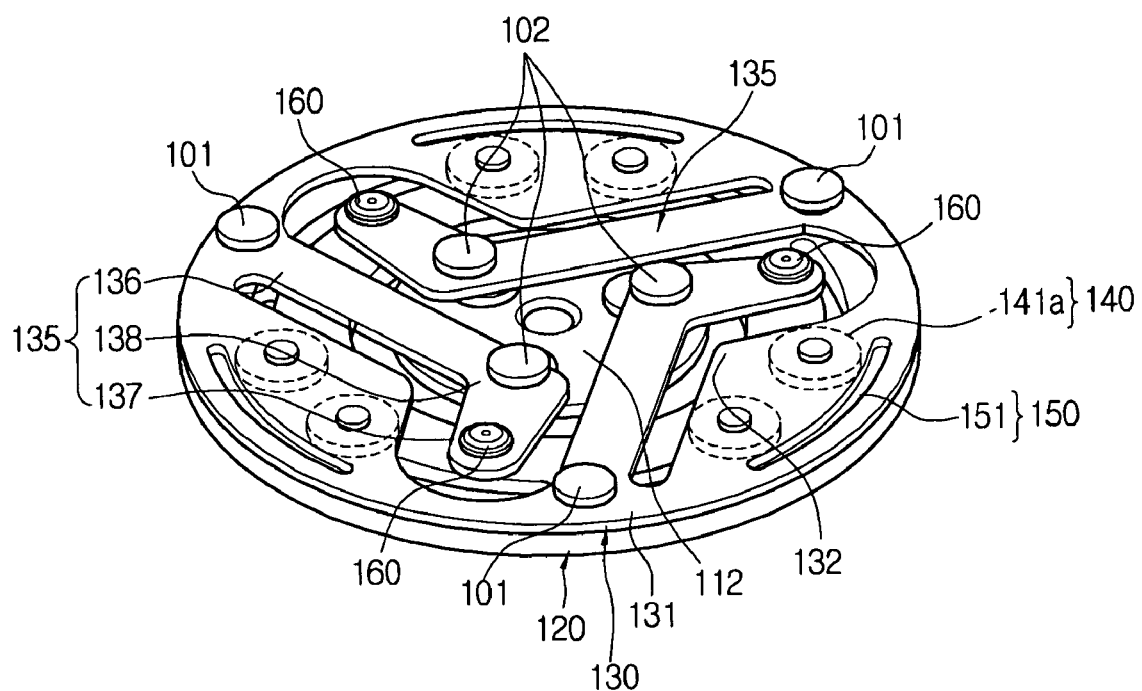
FIG. 6 is an assembled perspective view showing a disc and hub assembly according to a second embodiment of the present invention.

FIG. 5 is an exploded perspective view showing a disc and hub assembly according to a second embodiment of the present invention and FIG. 6 is an assembled perspective view showing the disc and hub assembly according to the second embodiment of the present invention. For clarity, description of the same components as in the first embodiment will be omitted.

As shown in the drawings, the second embodiment has modified the configuration of the shock-absorbing means 140 of the first embodiment. The shock-absorbing means 140 are composed of a plurality of separate bumpers 141a of rubber material, which are coupled to the extension surfaces 132 of the plate portion 131.

Preferably, a plurality of (e.g., two in the drawing) bumpers 141a are separately coupled to the respective bumper coupling holes 133, which are formed on the extension surfaces 132. More than two bumpers 141a may be separately coupled to the respective extension surfaces 132.

Fastening hooks 142a are integrally formed with the bumpers 141a for coupling with the bumper coupling holes 133.

The second embodiment has reduced the weight and volume of the bumpers 141a, compared with the first embodiment wherein each of the bumpers 141 is configured as a single body and is coupled to each of the extension surfaces 132. As a result, they are less subject to centrifugal force during high speed revolution of the disc 120. This, prevents the bumpers 141a from separating or being damaged, e.g., being torn off, and reduces cost.

A separation preventing means 150 is positioned between the disc 120 and the plate portion 130 to be in close contact with the outer peripheral surface of each of the bumpers 141a, to prevent the bumpers 141a from separating from the plate portion 131 of the plate spring 130, due to continuous centrifugal force, during high speed revolution of the disc 120.

The separation preventing means 150 includes a plurality of arc-shaped protrusions 151 which are formed on the plate portion 131 along a circumferential direction of the plate spring to correspond to the outer periphery of the shock-absorbing means 140 in such a manner as to protrude downwardly from the plate portion.

In particular, the protrusion 151 is formed by a pressing process, in such a manner as to protrude toward the disc 120 and surround the outer periphery of each of the bumpers 141a. This prevents the bumpers 141a from separating, even when they are subject to strong centrifugal force.

Figure 7:
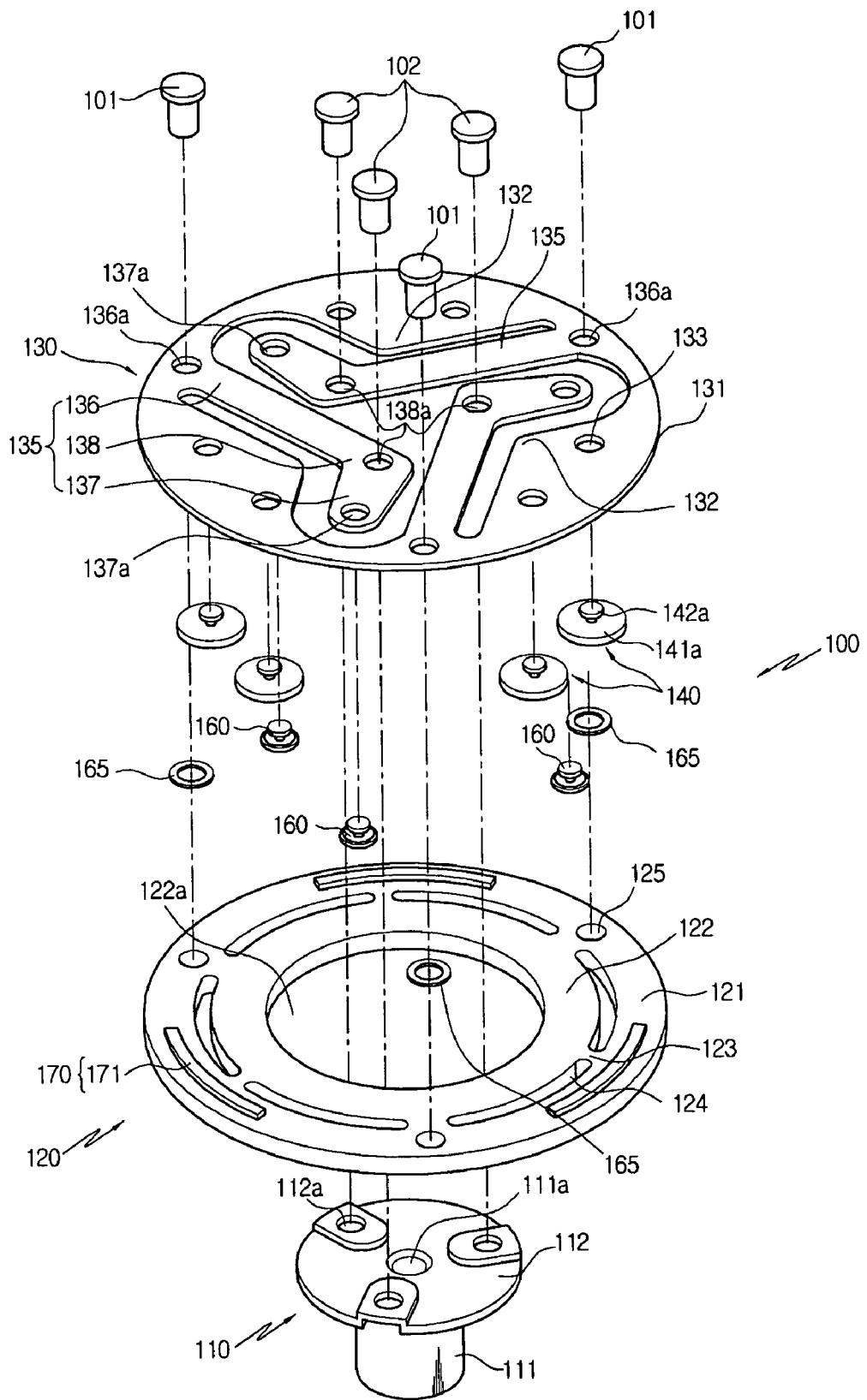
FIG. 7 is an exploded perspective view showing a disc and hub assembly according to a third embodiment of the present invention.

FIG. 7 is an exploded perspective view showing a disc and hub assembly according to a third embodiment of the present invention. For clarity, description of the same components as in the first and second embodiment will be omitted.

As shown in the drawing, the third embodiment has modified the configuration of the separation preventing means 150 of the second embodiment. The separation preventing means 170 of the third embodiment includes a number of arc-shaped protrusions 171 formed on the disc 120 at regular intervals along a circumferential direction of the disc spring to correspond to the outer periphery of the shock-absorbing means 140.

The protrusion 171 protrudes upwardly from the disc 120 toward the plate portion 131 and supports the outer periphery of each of the bumpers 141a, while surrounding it, to prevent them from separating from the plate portion 131 of the plate spring.

The operation of the disc and hub assembly 100 according to the present invention will now be described.

When electric power is applied to an electromagnetic coil of a field core unit (not shown), the electronic coil generates an electromagnetic force and power from the engine is transmitted to the disc 120. The disc 120 is then moved toward a rotating pulley (not shown) and is attracted to a friction surface of the pulley.

Due to the friction force between the disc 120 and the pulley, power from the engine is transmitted to a driving shaft of the compressor via the disc 120, the leaf spring portions 135 of the plate spring 130, and the hub 110.

When the application of electric power to the electromagnetic coil is interrupted, the disc 120 is separated from the friction surface of the pulley, due to an elastic restoration force from the leaf spring portions 135, and power is no longer transmitted to the driving shaft of the compressor.

In a state where the disc 120 is attracted to the pulley, the leaf spring portions 135 are elastically deformed. If the application of electric power to the electronic coil is interrupted in this state and the pulling force due to the flux disappears, the disc 120 is separated from the pulley, due to the elastic restoration force from the leaf spring portions 135, and returns to its initial state.

A metallic hitting sound, which is generated when the disc 120 is attracted to the pulley, is absorbed by the bumpers 141 and 141a and a noise, which is generated when the disc 120 returns to its initial position due to the restoration force from the leaf springs 135 and hits the leaf springs 135, is absorbed by the dampers 160 primarily and by the bumpers 141 and 141a secondarily. This reduces noise remarkably.

Furthermore, a protrusion 151 formed on the plate portion 131 of the plate spring 130 prevents the bumps 141 and 141a from separating from the plate portion 131 of the plate spring 130, even when they are subject to strong centrifugal force, during high speed revolution of the disc 120. This improves the durability of the bumpers 141 and 141a and avoids any deformation thereof. As a result, the noise reduction effect is maximized.

Meanwhile, since the expansion surfaces 132 of the plate portion 131 cover the slots 124 of the disc 120, together with the leaf spring portions 135, dusts or alien substances cannot enter the inside of the assembly through the slots 124 of the disc 120 from the outside and reach the friction surface of the pulley. Thus, the friction force between the disc 120 and the pulley is improved and any damage of the friction surface between them is avoided. As a result, the power transmission efficiency is improved.

As mentioned above, the present invention provide a disc and hub assembly for an electromagnetic clutch of a compressor wherein a bumper, which is configured as a single body or is separated into a plurality of fractions, is coupled between its disc and plate spring and a number of arc-shaped protrusions are formed on the outer periphery of the bumper, so that noise and impact are reduced during on/off of the electronic clutch, and the bumper is prevented from separating due to centrifugal force or being damaged, e.g., being torn off, thereby achieving cost-saving and improving durability, as well as further improving noise reduction effect.

In addition, any alien substance is prevented from entering the inside of the assembly and reaching the friction surface between the disc and the pulley, so that any damage to the friction is avoided and the power transmission efficiency is improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A disc and hub assembly for an electromagnetic clutch of a compressor comprising:
    a disc adapted to be attracted to or separated from a friction surface of a pulley under the action of an electromagnetic coil;
    a hub adapted to be coupled to a driving shaft of the compressor, the hub penetrating the disc and having a flange formed on its outer peripheral surface;
    a plate spring which includes a plate portion coupled to a top surface of the disc, a number of leaf spring portions obliquely extending inwardly from the plate portion to be coupled to the flange of the hub and having ends which are bent toward the disc, and dampers coupled to the ends of the leaf spring portions; and
    shock-absorbing means interposed between the disc and the plate portion to reduce noise and impact while the clutch is engaged or disengaged.

2. The disc and hub assembly as claimed in claim 1, further comprising a separation preventing means positioned between the disc and the plate portion to be in close contact with an outer periphery of the shock-absorbing means to prevent the shock-absorbing means from separating from the plate portion of the plate spring due to centrifugal force during revolution of the disc.

3. The disc and hub assembly as claimed in claim 1, wherein the plate portion includes extension surfaces that extend along the bent contours of the respective leaf spring portions and wherein the shock-absorbing means includes a bumper which is configured as a single body and is coupled to each extension surface of the plate portion.

4. The disc and hub assembly as claimed in claim 1, wherein the plate portion includes extension surfaces that extend along the bent contours of the respective leaf spring portions and wherein the shock-absorbing means includes a bumper that is divided into a plurality of fractions and is coupled to each extension surface of the plate portion.

5. The disc and hub assembly as claimed in claim 2, wherein the separation preventing means includes a plurality of protrusions which are formed on the plate portion along a circumferential direction of the plate spring to correspond to the outer periphery of the shock-absorbing means.

6. The disc and hub assembly as claimed in claim 2, wherein the separation preventing means includes a plurality of protrusions that are formed on the disc along a circumferential direction of the disc to correspond to the outer periphery of the shock-absorbing means.

* * * * *